US009055195B2

(12) United States Patent
Bengeult et al.

(10) Patent No.: US 9,055,195 B2
(45) Date of Patent: *Jun. 9, 2015

(54) METHOD AND APPARATUS FOR PROVIDING BI-DIRECTIONAL DATA SERVICES AND LIVE TELEVISION PROGRAMMING TO MOBILE PLATFORMS

(71) Applicant: The Boeing Company, Chicago, IL (US)

(72) Inventors: Greg A. Bengeult, Auburn, WA (US); Jeffrey P. Harrang, Sammamish, WA (US); William R. Richards, Issaquah, WA (US); Michael G. Lynch, Seattle, WA (US); Michael De La Chapelle, Bellevue, WA (US); Paulus J. Martens, Seattle, WA (US); Ronald S. Carson, Renton, WA (US); Richard D. Williams, II, Kent, WA (US); Daniel F. Miller, Sumner, WA (US); Geoffrey O. White, Kent, WA (US); George Fitzsimmons, Kent, WA (US); Russell Berkheimer, Issaquah, WA (US); Robert P. Higgins, Seattle, WA (US); Arthur F. Morrison, Kent, WA (US)

(73) Assignee: The Boeing Company, Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 14/171,627

(22) Filed: Feb. 3, 2014

(65) Prior Publication Data
US 2014/0150033 A1 May 29, 2014

Related U.S. Application Data

(63) Continuation of application No. 13/176,570, filed on Jul. 5, 2011, now Pat. No. 8,646,010, which is a continuation of application No. 12/272,299, filed on Nov. 17, 2008, now abandoned, which is a continuation of application No. 09/639,912, filed on Aug. 16, 2000, now abandoned.

(51) Int. Cl.
H04N 7/18 (2006.01)
H04N 7/173 (2011.01)
(Continued)

(52) U.S. Cl.
CPC ........... H04N 7/173 (2013.01); H04B 7/18508 (2013.01); H04N 7/147 (2013.01);
(Continued)

(58) Field of Classification Search
USPC ................... 725/64–66, 75–77; 709/217–232
See application file for complete search history.

(56) References Cited

U.S. PATENT DOCUMENTS 3,972,045 A 7/1976 Perret
4,392,139 A 7/1983 Aoyama et al.
(Continued)

FOREIGN PATENT DOCUMENTS

EP 0577054 A1 1/1994
EP 1096699 A2 5/2001
(Continued)

OTHER PUBLICATIONS

Vertatschitsch, Edward J. and Fitzsimmons, George W. Boeing Satellite Television Airplane Receiving System (STARS) Performance, Session 8—Mobile Terminal Antennas, International Mobile Satellite Conference, Ottawa, -IMSC 95, pp. 301-305.

Primary Examiner — Annan Shang
(74) Attorney, Agent, or Firm — Baker & Hostetler LLP

(57) ABSTRACT

A system for bi-directional data content transfer between a plurality of mobile platforms, such as aircraft or cruise ships, and a ground-based control segment. The system includes the ground-based control segment, a space segment and a mobile system disposed on each mobile platform. The ground-based control segment includes an antenna which is used to transmit encoded RF signals representative of data content to the space segment. The space segment includes a plurality of satellite transponders, with one of the transponders being designated by the ground-based control segment to transpond the encoded RF signals to the mobile system. The mobile system includes steerable receive and transmit antennas. The receive antenna receives the encoded RF signals from the satellite transponder, which are thereafter decoded, demodulated, D/A converted by a communications subsystem and transmitted to a server. The server filters off that data content not requested by any occupants on the mobile system. A local area network (LAN) receives the remaining data content and provides same to individual users on the mobile platform in accordance with previously submitted programming requests or data input by the users at access stations associated independently with each user. The transmit antenna is used to transmit data content from laptop computers, PDAs or other user electronic devices coupled to the access stations back to the designated satellite transponder. The satellite transponder then transponds the data back to the antenna of the ground-based control segment.

17 Claims, 2 Drawing Sheets

(51) Int. Cl.
  *H04B 7/185*  (2006.01)
  *H04N 7/14*  (2006.01)
  *H04N 7/20*  (2006.01)
  *H04N 21/214*  (2011.01)
  *H04N 21/2187*  (2011.01)
  *H04N 21/2543*  (2011.01)
  *H04N 21/41*  (2011.01)
  *H04N 21/61*  (2011.01)

(52) U.S. Cl.
  CPC ............ *H04N 7/20* (2013.01); *H04N 21/2146* (2013.01); *H04N 21/2187* (2013.01); *H04N 21/2543* (2013.01); *H04N 21/4126* (2013.01); *H04N 21/6143* (2013.01)

(56) References Cited

U.S. PATENT DOCUMENTS

| | | | | |
|---|---|---|---|---|
| 4,503,525 A * | | 3/1985 | Malik et al. | 365/222 |
| 4,513,315 A * | | 4/1985 | Dekker et al. | 725/67 |
| 4,743,906 A | | 5/1988 | Fullerton | |
| 4,866,515 A | | 9/1989 | Tagawa et al. | |
| 4,901,307 A | | 2/1990 | Gilhousen et al. | |
| 4,958,381 A | | 9/1990 | Toyoshima | |
| 5,127,021 A | | 6/1992 | Schreiber | |
| 5,146,234 A | | 9/1992 | Lalezari | |
| 5,230,076 A | | 7/1993 | Wilkinson | |
| 5,249,303 A | | 9/1993 | Goeken | |
| 5,285,470 A * | | 2/1994 | Schreiber | 348/384.1 |
| 5,289,272 A | | 2/1994 | Rabowsky et al. | |
| 5,311,302 A | | 5/1994 | Berry et al. | |
| 5,313,457 A | | 5/1994 | Hostetter et al. | |
| 5,463,656 A | | 10/1995 | Polivka et al. | |
| 5,495,258 A | | 2/1996 | Muhlhauser et al. | |
| 5,524,272 A | | 6/1996 | Podowski et al. | |
| 5,555,466 A | | 9/1996 | Scribner et al. | |
| 5,568,484 A | | 10/1996 | Margis | |
| 5,583,735 A | | 12/1996 | Pease et al. | |
| 5,592,539 A | | 1/1997 | Amarant et al. | |
| 5,717,878 A * | | 2/1998 | Sannino | 725/117 |
| 5,760,819 A * | | 6/1998 | Sklar et al. | 725/76 |
| 5,761,602 A | | 6/1998 | Wagner et al. | |
| 5,761,606 A | | 6/1998 | Wolzien | |
| 5,790,175 A | | 8/1998 | Sklar et al. | |
| 5,801,751 A | | 9/1998 | Sklar et al. | |
| 5,861,856 A | | 1/1999 | Beele et al. | |
| 5,973,647 A | | 10/1999 | Barrett et al. | |
| 5,974,349 A | | 10/1999 | Levine | |
| 5,974,444 A * | | 10/1999 | Konrad | 709/203 |
| 5,991,596 A * | | 11/1999 | Cunningham et al. | 455/12.1 |
| 6,018,659 A | | 1/2000 | Ayyagari et al. | |
| 6,023,242 A | | 2/2000 | Dixon | |
| 6,034,634 A | | 3/2000 | Karlsson et al. | |
| 6,047,165 A | | 4/2000 | Wright et al. | |
| 6,061,562 A | | 5/2000 | Martin et al. | |
| 6,078,577 A | | 6/2000 | Bishop et al. | |
| 6,104,914 A | | 8/2000 | Wright et al. | |
| 6,108,523 A | | 8/2000 | Wright et al. | |
| 6,175,717 B1 | | 1/2001 | Rebec et al. | |
| 6,208,307 B1 | | 3/2001 | Frisco et al. | |
| 6,249,913 B1 | | 6/2001 | Galipeau et al. | |
| 6,314,366 B1 | | 11/2001 | Farmakis et al. | |
| 6,356,235 B2 | | 3/2002 | Laidig et al. | |
| 6,477,152 B1 | | 11/2002 | Hiett | |
| 6,529,706 B1 * | | 3/2003 | Mitchell | 455/12.1 |
| 6,574,338 B1 | | 6/2003 | Sachdev | |
| 6,741,841 B1 | | 5/2004 | Mitchell | |
| 6,751,442 B1 | | 6/2004 | Barrett | |
| 6,757,712 B1 | | 6/2004 | Bastian et al. | |
| 6,807,538 B1 | | 10/2004 | Weinberger et al. | |
| 8,646,010 B2 | | 2/2014 | Bengeult et al. | |
| 2002/0160773 A1 | | 10/2002 | Gresham et al. | |

FOREIGN PATENT DOCUMENTS

| | | |
|---|---|---|
| EP | 1209928 A2 | 5/2002 |
| WO | WO 94/24773 A1 | 10/1994 |
| WO | WO 00/14987 A1 | 3/2000 |
| WO | WO 01/97433 A2 | 12/2001 |

* cited by examiner

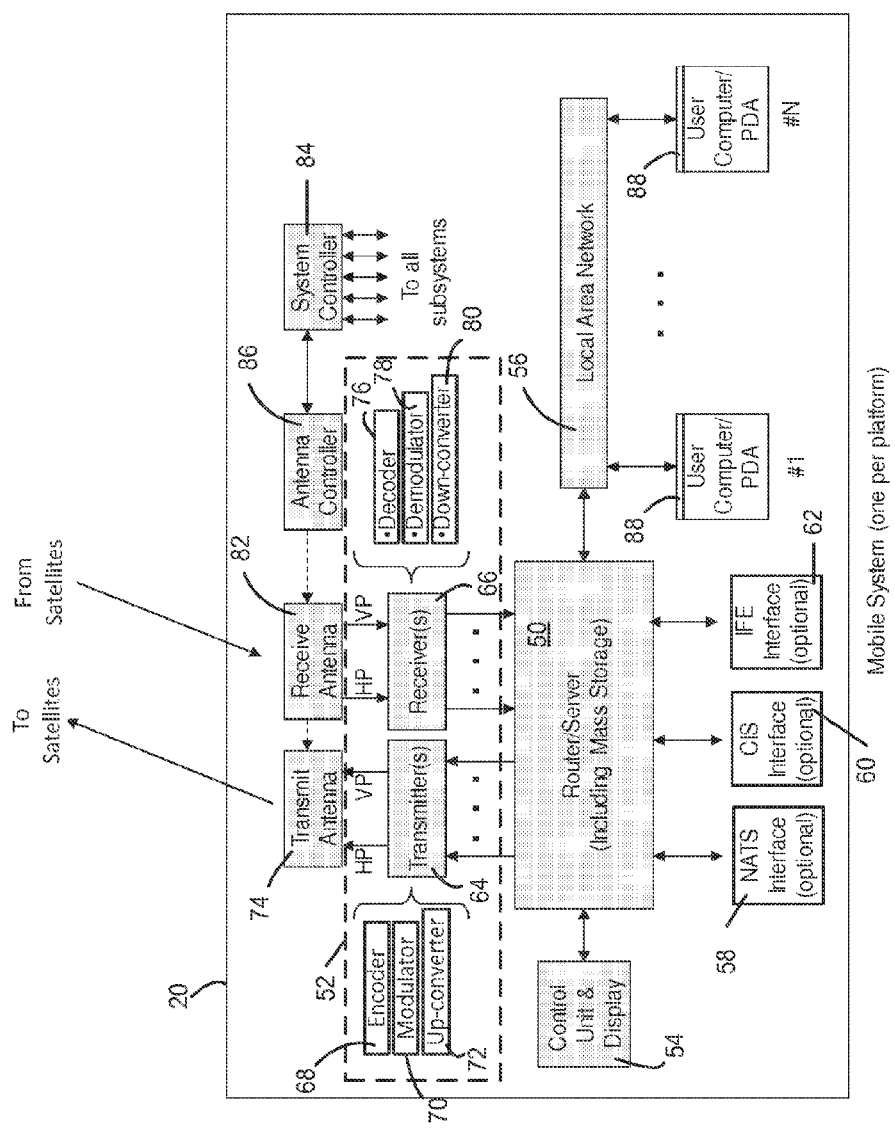
Fig. 2 Mobile System

METHOD AND APPARATUS FOR PROVIDING BI-DIRECTIONAL DATA SERVICES AND LIVE TELEVISION PROGRAMMING TO MOBILE PLATFORMS

CROSS REFERENCE TO RELATED APPLICATIONS

This application is a continuation of U.S. patent application Ser. No. 13/176,570, filed Jul. 5, 2011, now U.S. Pat. No. 8,646,010, which is a continuation of U.S. patent application Ser. No. 12/272,299, filed Nov. 17, 2008, which is a continuation of U.S. patent application Ser. No. 09/639,912, filed on Aug. 16, 2000. The entire disclosures of the above applications are incorporated herein by reference.

FIELD

This disclosure relates to worldwide systems for supplying live television programming and bi-directional data services to mobile platforms, such as aircraft, using satellite communication.

BACKGROUND

Broadband data and video services, on which our society and economy have grown to depend, have heretofore generally not been readily available to users on board mobile platforms such as aircraft, ships, trains, automobiles, etc. While the technology exists to deliver such services to all forms of mobile platforms, past solutions have been generally quite expensive, low data rate and/or available to only very limited markets of government/military users and some high-end maritime markets (i.e., cruise ships).

At present, a wide variety of broadcast television (TV) services are available to terrestrial users via satellite links. Such services include commercial Direct Broadcast Satellite (DBS) services (such as DirecTV® and EchoStar®) and custom video, such as rebroadcast video, over private Fixed Satellite Services (FSS) or Broadcast Satellite Services (BSS) satellites. The data services which can be provided via satellite link include all conventional Internet services (e.g., email, web browsing, NetMeeting, etc.), as well as virtual private networks (VPNs) for corporate and government customers.

Previously developed systems which have attempted to provide live TV and data services to mobile platforms have done so with only limited success. One major obstacle has been the high cost of access to such broadband data and video services. Another problem is the limited capacity of previously developed systems, which is insufficient for mobile platforms carrying dozens, or even hundreds, of individuals who each may be simultaneously requesting different channels of programming or different data services. Furthermore, presently existing systems are generally not readily scalable to address the demands of the traveling public.

Certain services currently available provide a limited subset of the above described services. One such service provides a narrow-bandwidth Internet connection to users on a mobile platform. Another service provides either TV broadcast services from available direct broadcast signals (i.e., EchoStar® and DirectTV®) or provides a custom TV broadcast signal through dedicated satellite links (i.e., Airshow®). However, no system or method presently exists for providing high speed (i.e., greater than 64 Kbps) data networking services to groups of users on mobile or remote platforms, let alone for providing such high-speed networking services together with video services.

There are several operational systems that provide limited Internet data services on commercial airlines and cruise ships. These systems are very limited in their link capability (primarily use communication links developed for telephony) and the service is very expensive (greater than about $1.00 per minute for voice connection). For these reasons, and in view of adherent limitations on the capacity of such systems, such systems have met with limited commercial success and acceptance.

Current operational systems generally use Inmarsat satellite communication links or terrestrial wireless communication links (i.e., the National Air Telephone System "NATS") to achieve 2-way connectivity to mobile platforms. These connection forms have several drawbacks:

1) a limited connection bandwidth (typically less than 64 Kbps);
2) limited overall system capacity (due to limited frequency spectrum); and
3) high expense.

Inmarsat operates in the L-band frequency spectrum, where there is very little bandwidth and capacity available for providing broadband services to the traveling public. NATS based solutions (i.e., GTE Airfone®, AT&T Claircom), familiar to domestic airline travelers who use seat back-mounted telephones, also provide very limited capacity because of operation at L-band. These systems also suffer from the additional problem that connectivity is only available over land.

Current mobile platform connection methods are inherently narrow band and restrict the flow of data to the point where common networking tasks are impossible. Typically, this connectivity is achieved through the use of a standard computer telephone modem between the user's computer and the air-ground or ship-shore telephony system. In this scenario, each user gets exclusive use of a full communications channel for the duration of his/her networking session and effectively prevents others from using that portion of the telephony system.

One other service that has received some attention is a service that provides pre-stored world-wide-web content to users on a mobile platform. This service is anticipated to incorporate a server located on a mobile platform to provide its stored content to users on the mobile platform through a simple touchscreen interface. The content located on the server would be updated once every few weeks while the mobile platform is in an inactive mode, such as when an aircraft is parked at an airport gate or a ship is docked at a port. The update of the data on the mobile platform would be accomplished through the loading of CDROMS or swapping of hard drives on the server. Although the content stored on the mobile platform with this service can be varied, it will never be timely.

In view of the foregoing, there is a significant need to provide a system and method for providing live television programming and bi-directional data communication to users onboard mobile platforms via one or more satellite links. More specifically, there is a need to provide Internet data communication, Direct Broadcast Satellite Services via BSS satellites, and rebroadcast video of live television programming via Ku or Ka-band satellites to a plurality of users onboard one or more mobile platforms, and in a manner which allows each user to request and receive Internet or other forms of real time data, as well specific live programming which he/she desires to view.

There is also a need to provide a system and method for enabling hundreds or more mobile platforms, such as aircraft, to communicate with a plurality of satellites, where each satellite includes a plurality of independent transponders, such that each mobile platform can communicate with an assigned transponder to permit bi-directional data communications by each passenger and viewing by each passenger of selected live TV programming.

SUMMARY

The present disclosure is directed to a method and apparatus for providing television and data services to mobile platforms, in accordance with embodiments of the present disclosure. In one embodiment, the system of the present disclosure makes use of a ground based segment for receiving video and data content and transmitting the content using radio frequency signals in accordance therewith via a ground based antenna to a space segment. The space segment includes a satellite incorporating at least one transponder, and more preferably a plurality of independent transponders, which receives the radio frequency (RF) signals transmitted from the antenna of the ground segment and relays these signals to at least one mobile system, and more typically to a large plurality of mobile systems, using the satellite-based transponders. Each mobile system is located on a mobile platform (e.g., aircraft, ship, etc.) and receives the RF signals from at least one of the satellite transponders and distributes the transponded video and data content to individual users in accordance with selections made by the users. Thus, each user only receives the video programming and/or data content that he/she specifically selected or requested.

Optionally, but preferably, the ground-based segment includes at least one dedicated link to an Internet service provider. One or more dedicated links may also be provided to various private/corporate Intranet accounts. A content management center in the ground segment is also in communication with a network operations center thereof for controlling transmission of the live television programming and other data to the space segment.

All information sent from the ground station to the mobile platform is broadcast over the entire coverage region of the satellite transponder. Each satellite is located in a geostationary orbit (GSO) or in a non-geostationary (NGSO) orbit. Packet multiplexing is preferably used to provide multiple simultaneous access to a plurality of users on each mobile platform.

The mobile system incorporates a suitable antenna system for effecting bi-directional communications with its assigned transponder. In one preferred form, the antenna system comprises a steerable antenna carried by the mobile platform for receiving and transmitting RF signals to and from the satellites within the coverage region. The antenna system is coupled to a receiver which decodes and de-modulates the received RF signals to produce digital video and audio, as well as data content signals. These signals are preferably provided in the form of packets, and fed to a router which filters the packets such that only content selected/requested by users on the mobile platform is distributed to the users. In this context users are defined as passengers, cabin crew, cockpit crew, maintenance crew, and non-human entities such as unattended data devices. A distribution system routes the data content directly to the proper users at access stations associated independently with each user, or to designated components (such as overhead monitors) located throughout the mobile platform. Thus, each user or occupant receives only the specific data content (i.e., either data or TV programming) that he/she has requested, or the data content can simply be provided to all passengers on the mobile platform.

The method and apparatus of the present disclosure thus provides the ability to conduct bi-directional data communications between a plurality of independent mobile platforms, where each user on each mobile platform is able to independently request and obtain Internet data or other forms of data in real time. The present disclosure further enables the users to independently request and view selected channels of live TV programming

BRIEF DESCRIPTION OF DRAWINGS

The various advantages of the present disclosure will become apparent to one skilled in the art by reading the following specification and subjoined claims and by referencing the following drawings in which:

FIG. 2 is a block diagram of the mobile system carried on each mobile platform.

DETAILED DESCRIPTION

Figure 1:
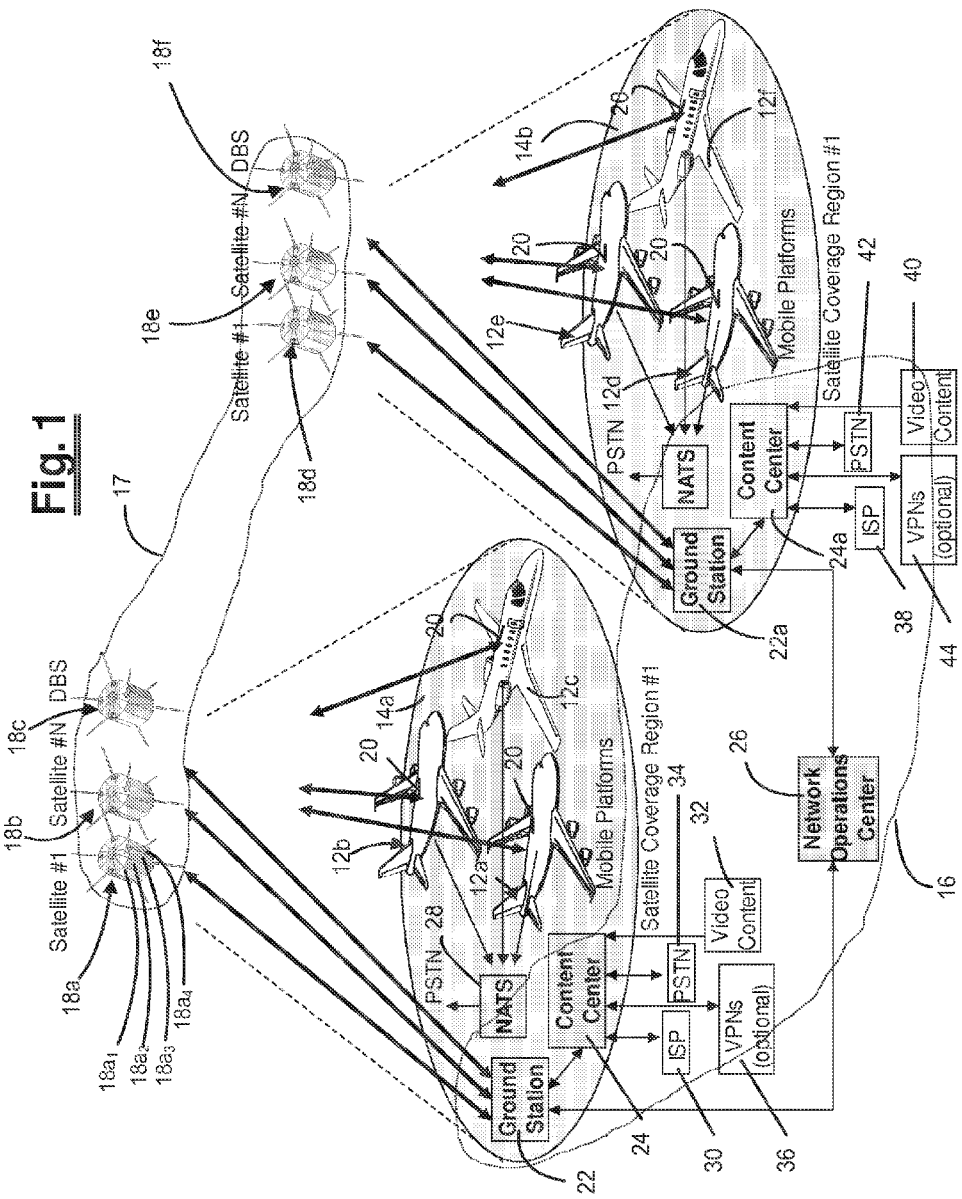
FIG. 1 is a simplified block diagram drawing illustrating the three major components of the system of the present disclosure.

Referring to FIG. 1, there is shown a system 10 in accordance with an embodiment of the present disclosure for providing data content to and from a plurality of moving platforms 12a-12f in one or more distinct coverage regions 14a and 14b. The system 10 generally comprises a ground segment 16, a plurality of satellites 18a-18f forming a space segment 17, and a mobile system 20 disposed on each moving platform 12. The moving platforms could comprise aircraft, cruise ships or any other moving vehicle. Thus, the illustration of the moving platforms 18 as aircraft in the figures herein, and the reference to the mobile platforms as aircraft throughout the following description should not be construed as limiting the applicability of the system 10 to only aircraft.

The space segment 17 may include any number of satellites 18 in each coverage region 14a and 14b needed to provide coverage for each region. Satellites 18a, 18b, 18d and 18e are preferably Ku or Ka-band satellites. Satellites 18c and 18f are Broadcast Satellite Services (BSS) satellites. Each of the satellites 18 are further located in a geostationary orbit (GSO) or a non-geostationary orbit (NGSO). Examples of possible NGSO orbits that could be used with this disclosure include low Earth orbit (LEO), medium Earth orbit (MEO) and highly elliptical orbit (HEO). Each of the satellites 18 includes at least one radio frequency (RF) transponder, and more preferably a plurality of RF transponders. For example satellite 18a is illustrated having four transponders $18a_1$-$18a_4$. It will be appreciated that each other satellite 18 illustrated could have a greater or lesser plurality of RF transponders as required to handle the anticipated number of mobile platforms 12 operating in the coverage area. The transponders provide "bent-pipe" communications between the aircraft 12 and the ground segment 16. The frequency bands used for these communication links could comprise any radio frequency band from approximately 10 MHz to 100 GHz. The transponders preferably comprise Ku-band transponders in the frequency band designated by the Federal Communications Commission (FCC) and the International Telecommunications Union (ITU) for fixed satellite services FSS or BSS satellites. Also, different types of transponders may be employed (i.e., each satellite 18 need not include a plurality of identical types of transponders) and each transponder may operate at a different frequency. Each of the transponders $18a_1$-$18a_4$ further include wide geographic coverage, high effective isotropic radiated power (EIRP) and high gain/noise temperature (G/T).

With further reference to FIG. 1, the ground segment 16 includes a ground station 22 in bi-directional communication with a content center 24 and a network operations center (NOC) 26. A second ground station 22a located in the second coverage area 14b may be used if more than one distinct coverage area is required for the service. In this instance, ground station 22a would also be in bi-directional communication with the NOC 26 via a terrestrial ground link or any other suitable means for establishing a communication link with the NOC 26. The ground station 22a would also be in bi-directional communication with a content center 24a. For the purpose of discussion, the system 10 will be described with respect to the operations occurring in coverage region 14a. However, it will be understood that identical operations relative to the satellites 18d-18f occur in coverage region 14b. It will also be understood that the disclosure may be scaled to any number of coverage regions 14 in the manner just described.

The ground station 22 comprises an antenna and associated antenna control electronics needed for transmitting data content to the satellites 18a and 18b. The antenna of the ground station 22 may also be used to receive data content transponded by the transponders $18a_1$-$18a_4$ originating from each mobile system 20 of each aircraft 12 within the coverage region 14a. The ground station 22 may be located anywhere within the coverage region 14a. Similarly, ground station 22a, if incorporated, can be located anywhere within the second coverage area 14b.

The content center 24 is in communication with a variety of external data content providers and controls the transmission of video and data information received by it to the ground station 22. Preferably, the content center 24 is in contact with an Internet service provider (ISP) 30, a video content source 32 and a public switched telephone network (PSTN) 34. Optionally, the content center 24 can also communicate with one or more virtual private networks (VPNs) 36. The ISP 30 provides Internet access to each of the occupants of each aircraft 12. The video content source 32 provides live television programming, for example, Cable News Network® (CNN) and ESPN®. The NOC 24 performs traditional network management, user authentication, accounting, customer service and billing tasks. The content center 24a associated with the ground station 22a in the second coverage region 14b would also preferably be in communication with an ISP 38, a video content provider 40, a PSTN 42, and optionally a VPN 44. An optional air telephone system 28 may also be included as an alternative to the satellite return link.

Referring now to FIG. 2, the mobile system 20 disposed on each aircraft 18 will be described in greater detail. Each mobile system 20 includes a data content management system in the form of a router/server 50 (hereinafter "server") which is in communication with a communications subsystem 52, a control unit and display system 54, and a distribution system in the form of a local area network (LAN) 56. Optionally, the server 50 can also be configured for operation in connection with a National Air Telephone System (NATS) 58, a crew information services system 60 and/or an in-flight entertainment system (IFE) 62.

The communications subsystem 52 includes a transmitter subsystem 64 and a receiver subsystem 66. The transmitter subsystem 64 includes an encoder 68, a modulator 70 and an Up-converter 72 for encoding, modulating and up-converting data content signals from the server 50 to a transmit antenna 74. The receiver subsystem 66 includes a decoder 76, a demodulator 78 and a down-converter 80 for decoding, demodulating and down-converting signals received by the receive antenna 82 into baseband video and audio signals, as well as data signals. While only one receiver subsystem 66 is shown, it will be appreciated that preferably a plurality of receiver subsystems 66 will typically be included to enable simultaneous reception of RF signals from a plurality of RF transponders. If a plurality of receiver subsystems 66 are shown, then a corresponding plurality of components 76-80 will also be required.

The signals received by the receiver subsystem 66 are then input to the server 50. A system controller 84 is used to control all subsystems of the mobile system 20. The system controller 84, in particular, provides signals to an antenna controller 86 which is used to electronically steer the receive antenna 82 to maintain the receive antenna pointed at a particular one of the satellites 18, which will hereinafter be referred to as the "target" satellite. The transmit antenna 74 is slaved to the receive antenna 82 such that it also tracks the target satellite 18. It will be appreciated that some types of mobile antennas may transmit and receive from the same aperture. In this case the transmit antenna 74 and the receive antenna 82 are combined into a single antenna.

With further reference to FIG. 2, the local area network (LAN) 56 is used to interface the server 50 to a plurality of access stations 88 associated with each seat location on board the aircraft 12a. Each access station 88 can be used to interface the server 50 directly with a user's laptop computer, personal digital assistant (PDA) or other personal computing device of the user. The access stations 88 could also each comprise a seat back mounted computer/display. The LAN 56 enables bi-directional communication of data between the user's computing device and the server 50 such that each user is able to request a desired channel of television programming, access a desired website, access his/her email, or perform a wide variety of other tasks independently of the other users on board the aircraft 12.

The receive and transmit antennas 82 and 74, respectively, may comprise any form of steerable antenna. In one preferred form, these antennas comprise electronically scanned, phased array antennas. Phased array antennas are especially well suited for aviation applications where aerodynamic drag is important considerations. One particular form of electronically scanned, phased array antenna suitable for use with the present disclosure is disclosed in U.S. Pat. No. 5,886,671, assigned to The Boeing Co.

Referring further to FIG. 1, in operation of the system 10, the data content is preferably formatted into Internet protocol (IP) packets before being transmitted by either the ground station 22, or from the transmit antenna 74 of each mobile system 20. For the purpose of discussion, a transmission of data content in the form of IP packets from the ground station 22 will be referred to as a "forward link" transmission. IP packet multiplexing is also preferably employed such that data content can be provided simultaneously to each of the aircraft 12 operating within the coverage region 14a using unicast, multicast and broadcast transmissions.

The IP data content packets received by each of the transponders $18a_1$-$18a_4$ are then transponded by the transponders to each aircraft 12 operating within the coverage region 14a. While multiple satellites 18 are illustrated over coverage region 14a, it will be appreciated that at the present time, a single satellite is capable of providing coverage to an area encompassing the entire continental United States. Thus, depending upon the geographic size of the coverage region and the mobile platform traffic anticipated within the region, it is possible that only a single satellite incorporating a single transponder may be needed to provide coverage for the entire region. Other distinct coverage regions besides the continental United States include Europe, South/Central America, East Asia, Middle East, North Atlantic, etc. It is anticipated that in service regions larger than the continental United States, that a plurality of satellites 18 each incorporating one or more transponders may be required to provide complete coverage of the region.

The receive antenna 82 and transmit antenna 74 are each preferably disposed on the top of the fuselage of their associated aircraft 18. The receive antenna 74 of each aircraft receives the entire RF transmission of encoded RF signals representing the IP data content packets from at least one of the transponders $18a_1$-$18a_4$. The receive antenna 82 receives horizontally polarized (HP) and vertically polarized (VP) signals which are input to at least one of the receivers 66. If more than one receiver 66 is incorporated, then one will be designated for use with a particular transponder $18a_1$-$18a_4$ carried by the target satellite 18 to which it is pointed. The receiver 66 decodes, demodulates and down-converts the encoded RF signals to produce video and audio signals, as well as data signals, that are input to the server 50. The server operates to filter off and discard any data content not intended for users on the aircraft 18 and then forwards the remaining data content via the LAN 56 to the appropriate access stations 88. In this manner, each user receives only that portion of the programming or other information previously requested by the user. Accordingly, each user is free to request and receive desired channels of programming, access email, access the Internet and perform other data transfer operations independently of all other users on the aircraft 12*a*.

An advantage of the present disclosure is that the system 10 is also capable of receiving DBS transmissions of live television programming (e.g., news, sports, weather, entertainment, etc.). Examples of DBS service providers include DirecTV® and Echostar®. DBS transmissions occur in a frequency band designated for broadcast satellite services (BSS) and are typically circularly polarized in North America. Therefore, a linear polarization converter may be optionally added to receive antenna 82 for receiving broadcast satellite services in North America. The FSS frequency band that carries the data services and the BSS frequency band that carries DBS transmissions are adjacent to each other in the Ku-band. In one optional embodiment of the system 10, a single Ku-band receive antenna can be used to receive either DBS transmissions from DBS satellites 18*c* and 18*f* in the BSS band or data services in the FSS band from one of the FSS satellites 18*a* or 18*b*, or both simultaneously using the same receive antenna 82. Simultaneous reception from multiple satellites 18 is accomplished using a multi-beam receive antenna 82 or by using a single beam receive antenna 82 with satellites co-located in the same geostationary orbit slot.

Rebroadcast television or customized video services are received and processed by the mobile system 20 in exactly the same way. Rebroadcast or customized video content is obtained from the video content source 32 and transmitted via the ground station 22 to the FSS satellites 18*a* and 18*b*. The video content is appropriately encoded for transmission by the content center 24 before being broadcast by the ground station 22. Some customization of the rebroadcast content may occur on the server 50 (FIG. 2) of the mobile system 20 to tailor advertisements and other information content to a particular market or interest of the users on the aircraft 12.

The bulk of data content provided to the users on each aircraft 12 is provided by using a private portal data content. This is implemented as a set of HTML pages housed on the server 50 of each mobile system 20. The content is kept fresh by periodically sending updated portions from a ground-based server located in content center 24, and in accordance with a scheduling function controlled by the NOC 26 of the ground segment 16. The server 50 can readily be configured to accept user log-on information to support authentication and authorization of users and to keep track of user and network accounting information to support a billing system. The authorization and accounting systems can be configured to communicate with the ground segment 16 to transfer accumulated data at convenient intervals to the NOC 26.

The system 10 of the present disclosure also provides direct Internet connectivity via satellite links for a variety of purposes, such as when a user on board the aircraft 12 desires to obtain data content that is not cached on server 50, or as an avenue for content sources to provide fresh content for the private portals. The server may be used to cache the most frequently requested web pages as well as to host a domain name system (DMS) look-up table of the most frequently accessed domains. The DMS look-up table is preferably maintained by the content center 24 and is periodically updated on the mobile system 20. Refreshing of the cached content of the portal may be accomplished by in-flight, periodic "pushed" cache refresh or at the gate of an airport terminal using any form of wired or wireless connection to the aircraft 18, or via a manual cache refresh by a crew member of the aircraft 12 carrying on board a CD ROM and inserting it into the cache server. The disclosure 10 implements the in-flight periodic, pushed cache refresh updates over the satellite links. Preferably, refreshing of the cache content occurs during periods of low demand on the satellite links.

The optional air telephone system 28 can also be employed with the system 10 when line-of-sight links to the ground segments 16 are established to provide the physical infrastructure. For example, an optional implementation incorporating an air telephone systems can be used for low data rate return links (2.4 kbps to 9.6 kbps). It will be recognized that other regions, such as Europe and Asia, have similar air telephone systems that communicate with aircraft using terrestrial cellular communications links. Air telephone systems (e.g., NATS in North America) were designed for carrying telephony traffic, but have been adapted to pass single user per call, point to point analog modem data. With the present disclosure, the aggregate return link traffic from the mobile system 20 is combined in server/router 50, a switch or a PBX (not shown) and then coupled into the air telephone return link via an analog modem or directly via a digital interface (e.g., CEPT-E1). Expanded capacity can be provided by establishing multiple simultaneous connections from the router/switch into the air telephone system. Multi-link, point to point (PPP) data encapsulation can be used to accomplish the splitting/recombining of the data streams between the airborne and NOC routers. In addition to expanded capacity, the tolerance to a single connection failure is increased with multiple connections through the air telephone system. The hand-over between separate air telephone system antenna towers is managed by the air telephone system and the connection between the respective air and ground routers is automatically maintained as the mobile platform traverses multiple coverage areas.

A significant anticipated application of the present disclosure is in connection with aircraft that fly extended periods of time over water and remote regions (including polar regions) of the Earth where there is little or no current satellite transponder coverage. The present disclosure can operate with GSO satellites launched in the future into orbit over oceans, or a new constellation of NGSO satellites to provide full Earth coverage (including the poles).

Referring further to FIG. 1, a transmission of data content from the aircraft 12a to the ground station 22 will be described. This transmission is termed a "return link" transmission. The antenna controller 86 causes the transmit antenna 74 to maintain the antenna beam thereof pointed at the target satellite 18a. The channels used for communication from each mobile system 20 back to the ground station 22 represent point-to-point links that are individually assigned and dynamically managed by the NOC 26 of the ground segment 16. For the system 10 to accommodate several hundred or more aircraft 12, multiple aircraft will need to be assigned to each transponder carried by a given satellite 18. The preferred multiple access methods for the return link are code division multiple access (CDMA), frequency divisional multiple access (FDMA), time division multiple access (TDMA) or combinations thereof. Thus, multiple mobile systems 20 may be assigned to a single transponder $18a_1$-$18a_4$. Where a greater number of aircraft 12 incorporating a mobile system 20 are operated within the coverage region 14a, then the number of transponders required increases accordingly.

The receive antenna 82 may implement a closed-loop tracking system for pointing the antenna beam and for adjusting the polarization of the antennas based on receive signal amplitude. The transmit antenna 74 is slaved to the point direction and polarization of the receive antenna 82. An alternative implementation could use an open-loop tracking method with the pointing direction and polarization determined by knowledge of mobile platform position and attitude using an on-board inertial reference unit (IRU) and knowledge of the location of the satellites 18.

Encoded RF signals are transmitted from the transmit antenna 74 of the mobile system 20 of a given aircraft 12 to an assigned one of the transponders $18a_1$-$18a_4$, and transponded by the designated transponder to the ground station 22. The ground station 22 communicates with the content center 24 to determine and provide the appropriate data being requested by the user (e.g., content from the world wide web, email or information from the user's VPN).

An additional concern that must be taken into account with the system 10 is the potential for interference that may result from the small aperture size of the receive antenna 82. The aperture size of the receive antenna 82 is typically smaller than conventional "very small aperture terminal" (VSAT) antennas. Accordingly, the beam from the receive antenna 82 may encompass adjacent satellites along the geosynchronous arc. This can result in interference from satellites other than the target satellite being received by a particular mobile system 20. To overcome this potential problem, the system 10 preferably uses a lower than normal forward link data rate that overcomes the interference from adjacent satellites. For example, the system 10 operates at a preferred forward link data rate of at least about 5 Mbps per transponder, using a typical FSS Ku-band transponder (e.g., Telstar-6) and an antenna having an active aperture of about 17 inches by 24 inches (43.18 cm by 60.96 cm). For comparison purposes, a typical Ku-band transponder usually operates at a data rate of approximately 30 Mbps using conventional VSAT antennas.

Using a standard digital video broadcast (DVB) waveform, the forward link signal typically occupies less than 8 MHz out of a total transponder width of 27 MHz. However, concentrating the transponder power in less than the full transponder bandwidth could create a regulatory concern. FCC regulations presently regulate the maximum effective isotropic radiated power (EIRP) spectral density from a transponder to prevent interference between closely spaced satellites. Accordingly, in one embodiment of the present disclosure, spread spectrum modulation techniques are employed in modulator 70 to "spread" the forward link signal over the transponder bandwidth using well known signal spreading techniques. This reduces the spectral density of the transponded signal, thus eliminating the possibility of interference between two or more mobile systems 20.

It is also equally important that the transmit antenna 74 meets regulatory requirements that prevent interference to satellites adjacent to the target satellite 18. The transmit antennas used in most mobile applications also tend to be smaller than conventional VSAT antennas (typically reflector antennas that are 1 meter in diameter). Mobile transmit antennas used for aeronautical applications should have low aerodynamic drag, be lightweight, have low power consumption and be of relatively small size. For all these reasons, the antenna aperture of the transmit antenna 74 is preferably smaller than a conventional VSAT antenna. VSAT antennas are sized to create an antenna beam that is narrow enough to illuminate a single FSS satellite along the geosynchronous arc. This is important because FSS satellites are spaced at 2° intervals along the geosynchronous arc. The smaller than normal antenna aperture of the transmit antenna 74 used with the present disclosure, in some instances, may create an antenna beam that is wide enough to irradiate satellites that are adjacent to the target satellite along the geosynchronous arc, which could create an interference problem. This potential problem is eliminated by employing spread spectrum modulation techniques on the return link transmissions as well. The transmitted signal from the transmit antenna 74 is spread in frequency to produce an interfering signal at the adjacent satellite that is below the threshold EIRP spectral density at which the signal would interfere. It will be appreciated, however, that spread spectrum modulation techniques may not be required if the angular spacing between satellites within a given coverage region is such that interference will not be a problem.

It will be appreciated that the system 10 of the present disclosure provides a means for providing bi-directional data content transfer to a large plurality of independent users onboard a large number of mobile platforms. The system 10 further enables data content such as rebroadcast video services, broadcast video services and other forms of data content to be provided in real time to a large plurality of mobile platforms such as aircraft, ships or virtually any other form of mobile platform carrying individuals who desire to access ground-based data content sources or to view live television and programming. The system further allows multiple mobile platforms within a given coverage region to communicate with one or a plurality of transponders within the given coverage region and to transmit data content via a satellite back to a ground-based control system. Accordingly, individual users on-board the mobile platform are able to independently access and obtain various forms of data content as well as selected channels of live television programming. Importantly, the system 10 of the present disclosure is scalable to accommodate large or small pluralities of mobile platforms, and also scalable over many satellites and coverage regions.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, specification and following claims.

What is claimed:

1. A system for providing data content to a plurality of mobile platforms via at least one satellite having a plurality of radio frequency (RF) transponders:
   a ground-based antenna system associated with a ground-based control center configured to transmit encoded RF signals representative of said data content via said plurality of RF transponders to a plurality of mobile systems, the mobile systems comprising:
      an on-board antenna system;
      a communications subsystem responsive to said antennas for generating baseband video signals and data signals from said encoded RF signals received by said antennas, and for producing encoded RF signals from data transmissions input by a plurality of users;
      a data content management system for filtering portions of said data content based on whether said data content is addressed to on the mobile platforms;
      a network for distributing said baseband video signals and said data signals output from said data content management system to said plurality of users, whereby said plurality of users receive specific sub-portions of said baseband video signals and said data signals based on selections made by said plurality of users; and
      said plurality of mobile systems operative to transmit inputs provided by said plurality of users via said on-board antenna system and one of said plurality of RF transponders over a return link transmission channel to said ground-based control center; and
   a terrestrial based network operations center (NOC) configured to:
      assign return link transmission channels to said plurality of mobile systems to form a plurality of point-to-point links over which said plurality of mobile systems mobile system can transmit information to the NOC; and
      dynamically manage the return link transmission channels using a multiple access protocol to determine which ones of the mobile systems will be assigned to use which ones of the plurality of RF transponders.

2. The system of claim 1, wherein said network comprises one or more access stations adapted to be coupled to personal computing devices operated by said users.

3. The system of claim 1, wherein said data content management system comprises a file server.

4. The system of claim 1, wherein said NOC is further configured to designate one of said transponders to communicate in dedicated fashion with a designated one of said mobile systems.

5. The system of claim 1, wherein said network comprises a local area network.

6. A system for providing real time video signals to users on a mobile receiving platform via a satellite having a plurality of radio frequency (RF) transponders, the system comprising:
   a mobile receiving system disposed on said mobile receiving platform comprising:
      an antenna for receiving RF signals representative of said video signals from said plurality of RF transponders;
      an antenna control system for use in steering said antenna to track said satellite as said mobile receiving platform is in motion;
      a communications system responsive to signals received by said antenna for generating baseband video signals in accordance therewith;
      a data content management system responsive to said communications system for determining which portions of said baseband video signals are to be transmitted to each of a plurality of users on said mobile receiving platform; and
      a distribution system for routing said portions of said baseband video signals in response to requests by said users, such that said users receive portions of said baseband video signals in accordance with requests made by said users;
   wherein said RF signals are transmitted by a ground based system comprising a network operations center (NOC) configured to:
      assign return link transmission channels to said mobile receiving system to form a point-to-point link over which said mobile receiving system transmits information to the NOC; and
      dynamically manage the return link transmission channel using a multiple access transmission protocol to determine which ones of the plurality of RF transponders are available for use by the mobile receiving system.

7. The system of claim 6, wherein said communications system comprises a plurality of integrated receiver/decoders for decoding, demodulating and digital-to-analog converting received RF signals into said baseband video signals.

8. The system of claim 6, wherein said data content management system comprises a server.

9. The system of claim 6, wherein said baseband video signals represent live television signals.

10. The system of claim 6, wherein said baseband video signals represent direct broadcast television signals.

11. The system of claim 6, wherein said NOC is further configured to manage accounting and billing operations associated with access to the system by said users.

12. The system of claim 6, wherein said NOC is further configured to transmit encoded data signals to said plurality of RF transponders of said satellite; and
   wherein said communications system operates to de-modulate and D/A convert said RF signals to produce said baseband video signals.

13. A system for providing a plurality of channels of data content to a plurality of mobile receiving platforms operable to provide the data content to a plurality of users, said system comprising:
   a ground based antenna for transmitting encoded radio frequency (RF) signals representative of said data content via at least one satellite having a plurality of RF transponders in orbit over a desired geographical coverage area for transponding said encoded RF signals;
   a mobile receiving system disposed on said mobile receiving platforms comprising:
      an antenna system including a receive antenna for receiving said encoded RF signals from a designated one of said RF transponders;
      a transmit antenna for transmitting said data content to a designated one of said RF transponders;
      an antenna system for steering said transmit and receive antennas to track said satellite as said mobile receiving platform is in motion;
      a communications system responsive to said encoded RF signals received by said receive antenna for demodulating and decoding said encoded RF signals to produce baseband video signals and data signals;

said communications system including a system for transmitting data content from said users, via said transmit antenna, to said designated one of said transponders;

a data content management system responsive to said mobile receiving system for determining which portions of said baseband video signals and which portions of said data signals are to be transmitted to specific ones of said users; and a network system for routing said portions of said baseband video signals and said data signals to specific ones of said users in response to requests by said users such that said users receives only a requested portion of said baseband video signals or a requested portion of said data signals; and a ground based system comprising a terrestrial based network operations center (NOC) configured to:

assign specific individual return link transmission channels to said mobile receiving system to form a plurality of point-to-point links over which said mobile receiving system transmits information to the NOC; and dynamically manage the individual return link transmission channels using a multiple access protocol to determine which ones of the mobile receiving systems will be assigned to use which ones of the plurality of RF transponders in forming the plurality of point-to-point links.

14. The system of claim 13, wherein said communications system comprises a plurality of integrated receiver/decoders.

15. The system of claim 13, wherein said data content management system comprises a server.

16. The system of claim 13, further comprising a data system for supplying crew information services to said data content management system.

17. The system of claim 13, further comprising an air telephone system on board said mobile platforms for transmitting data services to at least one ground based voice telephony receiving station within said coverage area.

* * * * *